S. M. CURWEN.
PASSENGER CAR.
APPLICATION FILED MAY 13, 1908.

901,786.

Patented Oct. 20, 1908.
2 SHEETS—SHEET 2.

Witnesses:-

Inventor-
Samuel M. Curwen.
by his Attorneys,

UNITED STATES PATENT OFFICE.

SAMUEL M. CURWEN, OF HAVERFORD, PENNSYLVANIA, ASSIGNOR TO THE J. G. BRILL COMPANY, OF PHILADELPHIA, PENNSYLVANIA, A CORPORATION OF PENNSYLVANIA.

PASSENGER-CAR.

No. 901,786.     Specification of Letters Patent.     Patented Oct. 20, 1908.

Application filed May 13, 1908. Serial No. 432,702.

*To all whom it may concern:*

Be it known that I, SAMUEL M. CURWEN, a citizen of the United States, residing in Haverford, Pennsylvania, have invented certain Improvements in Passenger-Cars, of which the following is a specification.

My invention relates to certain improvements in passenger cars of the type in which a passenger pays his fare on entering the car.

The object of my invention is to prevent the ingress of passengers to the body of the car while passengers are passing from the car at the rear end. This object I attain in the following manner, reference being had to the accompanying drawings, in which:—

Figure 1:
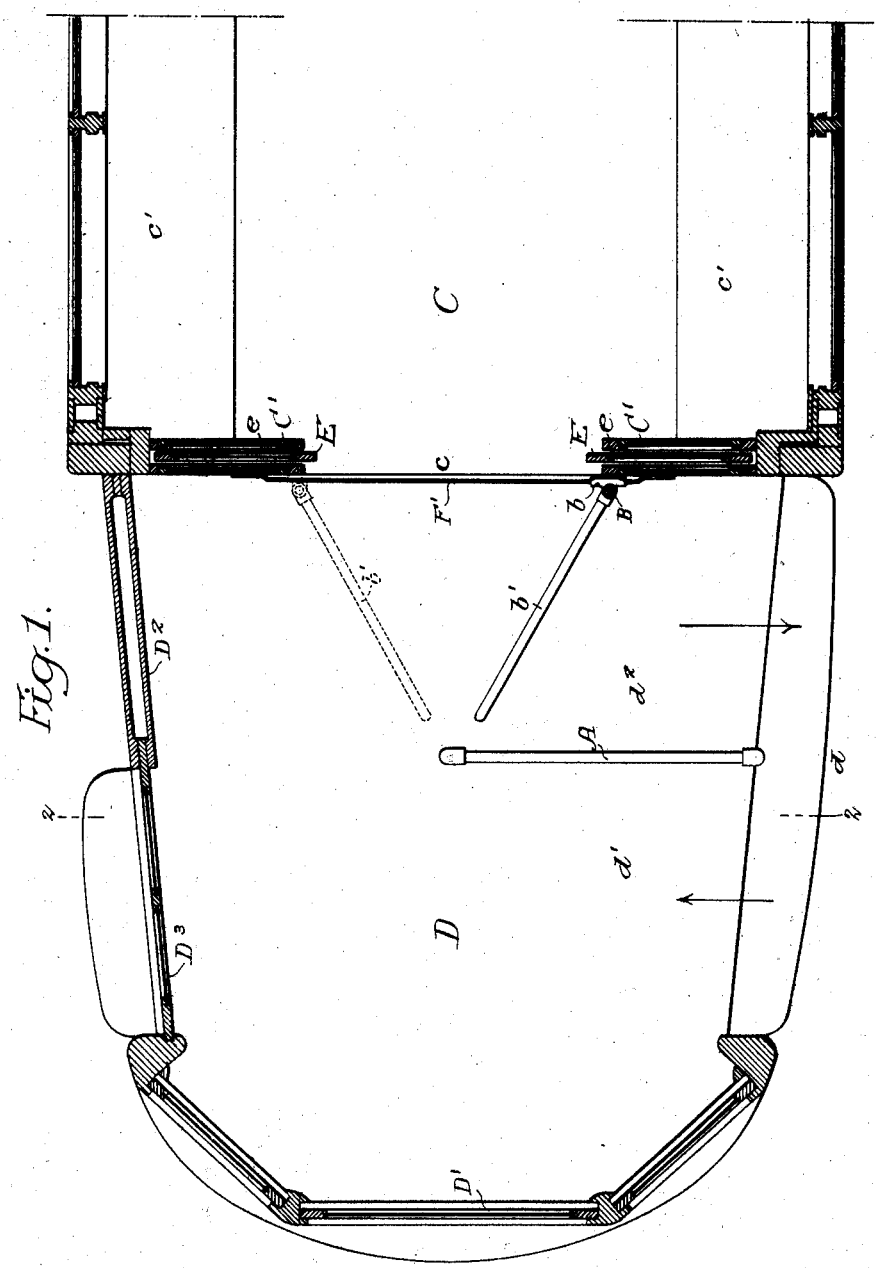
Figure 2:
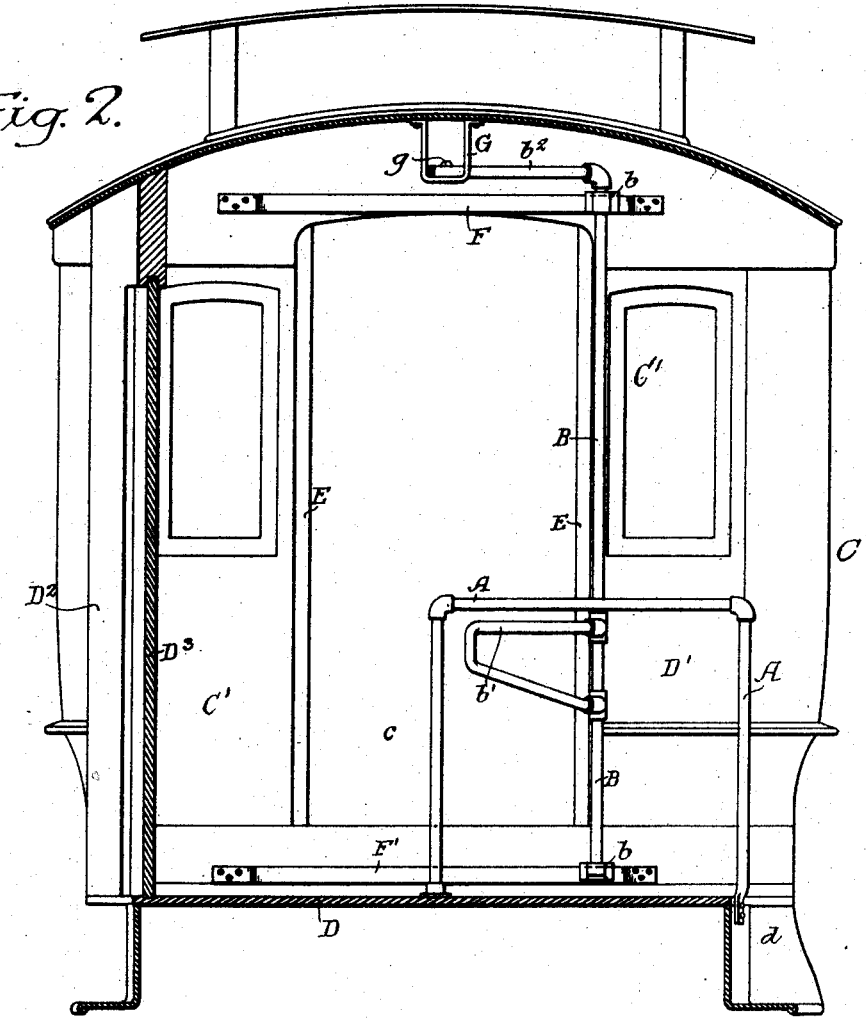
Figure 3:
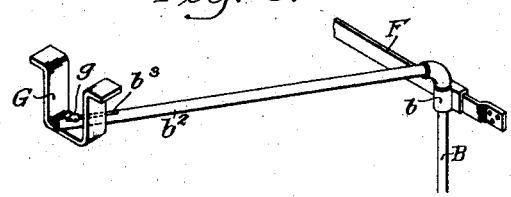

Figure 1, is a sectional plan view showing a platform of a car illustrating my invention; Fig. 2, is a transverse section on the line 2—2, Fig. 1; and Fig. 3, is a perspective view of a detail of the invention.

C is the body of the car; D is the platform; C' is a transverse partition dividing the platform from the body of the car, and $c$ is a central doorway of the ordinary width forming communication between the body of the car and the platform. This doorway can be closed by sliding doors E, E adapted to channels $e$ in the panel sections of the partition in the ordinary manner. The seats $c'$ of the car extend to the partition so that in this type of car the number of seats within the car is the same as in the ordinary car.

The platform D is inclosed in front by the ordinary vestibule framing D' and is open on one side for the ingress and egress of passengers, and on the other side there is a fixed panel $D^2$ and a sliding door $D^3$ closing the exit opening, which is only used when the platform is at the forward end of the car; the opposite side of the platform being entirely closed by a guard or doors, as desired, when at the forward end of the car.

A is a guard in the form of a rail, in the present instance extending from the side $d$ of the platform to a point at or about the center of the platform, and this guard rail separates the platform into two sections $d'$ and $d^2$—one for the ingress of passengers and one for the egress of passengers.

In order to prevent passengers entering the car while others are leaving it and also to block the exit passage when people are entering the car, I provide the following device:—B is a vertical shaft having its upper and lower bearings in slides $b, b$. The slides are adapted to travel on rails F, F', one extending across the car above the doorway $c$ and the other extending across the car below the doorway $c$, as in this type of car the floor of the platform is below the level of the floor of the car and consequently there is room for the rail below the sill of the doorway.

On the shaft B is a projecting guard $b'$, which is of a length to extend to a point near the inner end of the rail A, so as to block the passageway when it is moved in either of its two positions. On the upper end of the shaft B is an arm $b^2$, which is slotted at $b^3$, in the present instance for the reception of a pin $g$ projecting from a bracket G secured to the roof of the car. In some instances this rod may extend under the floor of the car and the bracket may be secured to the flooring if found desirable. Thus it will be seen that the conductor can shift the shaft B from one side of the doorway $c$ to the other, and as the shaft is shifted it will be turned, due to the fact that the arm $b^2$ is controlled by the pin $g$ and the guard $b'$ will assume either position shown in dotted lines or in full lines, Fig. 1.

When the car stops and the passengers are leaving by the rear of the car, the conductor moves the shaft B over to the position shown by dotted lines, Fig. 1, blocking the ingress passageway and leaving the egress passageway in unobstructed communication with the body of the car, so that passengers can leave the car without the annoyance of coming in contact with incoming passengers. As soon as the last passenger leaves the car the vertical shaft B is shifted to the position shown in full lines, blocking the exit opening and leaving the ingress section of the platform in unobstructed communication with the body of the car; the conductor remaining in the space between the guard $b'$ and the rail A so as to collect the fares of passengers entering the car from the platform.

I claim:—

1. The combination in a passenger car, of a body portion, a platform, a transverse partition having a doorway therein, a guard mounted at the partition and projecting over the platform and adapted to move from one side of the doorway to the other, and means for shifting the guard as it moves from one position to the other.

2. The combination in a passenger car, of a body portion, a platform, a transverse partition separating the body portion from the platform, a doorway in the partition, rails above and below the doorway, a shaft adapted to slide mounted on the rails, a guard secured to the shaft and extending over the platform, said shaft being adapted to move either to one side or the other of the doorway, and means for turning the shaft as it moves from one position to the other to change the position of the guard.

3. The combination in a passenger car, of a body portion, a platform, a transverse partition separating the platform from the body portion, a doorway in said partition, a transverse rail extending from one edge of the platform near the center thereof and separating the platform into ingress and egress sections, a vertical shaft mounted on the platform side of the doorway and arranged to be shifted from one side of the doorway to the other, a guard projecting from said shaft to a point near the inner end of the guard rail, and means for turning the shaft and the guard as the shaft is shifted from one side to the other of the doorway.

4. The combination in a passenger car, of a body portion, a platform, a transverse partition separating the body portion from the platform, a central doorway in said partition, transverse rails extending from one side of the platform to a point near the center thereof and dividing the platform into ingress and egress sections, the egress section being nearest the partition, two transverse rails, one above and the other below the doorway, slides adapted to said rails, a vertical shaft mounted in bearings in said slides, a guard secured to the shaft and projecting towards the inner end of the guard rail of the platform, an arm at one end of the shaft, and a fixed guide for the outer end of said arm so that when the shaft is shifted from one side of the doorway to the other the guide will turn the shaft through the arm.

5. The combination in a passenger car, of a body portion, a platform, a transverse partition separating the body portion from the platform, a central doorway therein, a guard extending from one side of the platform to a point near the center thereof separating the platform into ingress and egress sections, two transverse rails, one mounted below the doorway and the other mounted above the doorway, slides mounted on said rails, a vertical shaft adapted to bearings on the slides, a guard projecting from said vertical shaft to a point near the inner end of the guard that separates the platform into two sections, an arm on the upper end of said shaft, and a bracket secured to a fixed point and having a pin, said arm being slotted to receive the pin, so that when the shaft is moved from one side of the doorway to the other the guard will be shifted to block either the ingress or the egress passageway.

6. The combination in a passenger car, of a body portion, a platform, a transverse partition separating the body portion from the platform, a central doorway in said partition, doors closing said doorway, a transverse rail extending from one side of the platform to a point near the center thereof and dividing the platform into ingress and egress sections, the egress section being nearest the transverse partition, the floor of the platform being below the floor of the body portion, two transverse rails, one secured to the partition below the sill of the doorway and the other secured to the partition above the doorway, two grooved slides, one adapted to one rail and the other adapted to the other rail, a vertical shaft adapted to bearings in the slides, a guard secured to the shaft and projecting over the platform to a point near the inner end of the fixed guard, an arm secured to the upper end of the shaft, a bracket secured to the roof of the car and having a guide for the arm holding the outer end of the arm in a central position, so that when the shaft is shifted from one side of the doorway to the other it will turn and the guide will turn with it, obstructing either the ingress or the egress passageway.

In testimony whereof, I have signed my name to this specification, in the presence of two subscribing witnesses.

SAMUEL M. CURWEN.

Witnesses:
    Jos. H. Klein,
    Wm. A. Barr.